US007551637B2

United States Patent
Damnjanovic et al.

(10) Patent No.: US 7,551,637 B2
(45) Date of Patent: Jun. 23, 2009

(54) METHOD AND APPARATUS FOR CHANNEL SENSITIVE SCHEDULING IN A COMMUNICATION SYSTEM

(75) Inventors: Jelena Damnjanovic, Del Mar, CA (US); Durga Prasad Malladi, San Diego, CA (US); Serge D. Willenegger, Onnens (CH)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 11/040,871

(22) Filed: Jan. 20, 2005

(65) Prior Publication Data

US 2005/0201281 A1      Sep. 15, 2005

Related U.S. Application Data

(60) Provisional application No. 60/538,983, filed on Jan. 23, 2004.

(51) Int. Cl.
*H04L 1/00* (2006.01)
*H04J 3/16* (2006.01)
*G08C 15/00* (2006.01)
*G06F 11/00* (2006.01)
*G01R 31/08* (2006.01)

(52) U.S. Cl. .................... 370/412; 370/230; 370/235; 455/522

(58) Field of Classification Search ......... 370/230–235, 370/335–342, 412–474, 389–395; 455/435–450; 709/200–211
See application file for complete search history.

(56) References Cited

U.S. PATENT DOCUMENTS

| 4,901,307 | A | 2/1990 | Gilhousen et al. |
|---|---|---|---|
| 5,101,501 | A | 3/1992 | Gilhousen et al. |
| 5,103,459 | A | 4/1992 | Gilhousen et al. |
| 5,923,650 | A | 7/1999 | Chen et al. |
| 6,285,664 | B1 * | 9/2001 | Bernstein et al. ............ 370/318 |
| 6,335,922 | B1 | 1/2002 | Tiedemann, Jr. et al. |
| 6,347,120 | B1 * | 2/2002 | Sakoda ....................... 375/259 |
| 6,463,296 | B1 * | 10/2002 | Esmailzadeh et al. ....... 455/522 |
| 6,580,899 | B1 * | 6/2003 | Dalgleish et al. ............. 455/69 |
| 6,741,862 | B2 * | 5/2004 | Chung et al. ............. 455/452.1 |

(Continued)

FOREIGN PATENT DOCUMENTS

RU      2073913      2/1997

OTHER PUBLICATIONS

Damnjanovic et al., "Scheduling the cdma2000 Reverse Link", *IEEE 56th Vehicular Technology Conference Proceedings*, Vancouver, Canada, Sep. 24-28, 2002, vol. 1, Sep. 24, 2002, pp. 386-390, XP010608583.

(Continued)

*Primary Examiner*—M. Phan
(74) *Attorney, Agent, or Firm*—Dang M. Vo

(57) ABSTRACT

Method and apparatus for a channel sensitive scheduler for scheduling transmissions in a communication system. The scheduler is defined by a priority function of the channel condition as determined by amount of transmission power needed by a mobile station. In one embodiment the channel condition is determined based on the transmission pilot power of each mobile station and is used to calculate a priority value for each mobile station. The mobile stations are then scheduled to transmit based on the priority value.

17 Claims, 6 Drawing Sheets

U.S. PATENT DOCUMENTS

| | | | |
|---|---|---|---|
| 6,873,856 B2* | 3/2005 | Voyer | 455/522 |
| 7,352,698 B2* | 4/2008 | Niwano et al. | 370/230 |
| 2002/0093976 A1* | 7/2002 | Razoumov et al. | 370/444 |
| 2003/0081627 A1 | 5/2003 | Bao et al. | |
| 2003/0198207 A1* | 10/2003 | Lee et al. | 370/337 |
| 2004/0120306 A1* | 6/2004 | Wigard et al. | 370/349 |
| 2004/0218559 A1* | 11/2004 | Kim et al. | 370/318 |
| 2005/0063389 A1* | 3/2005 | Elliott et al. | 370/395.4 |
| 2005/0136840 A1* | 6/2005 | Molnar et al. | 455/63.1 |
| 2005/0141461 A1* | 6/2005 | Hosein et al. | 370/335 |
| 2007/0081498 A1* | 4/2007 | Niwano | 370/335 |
| 2007/0165575 A1* | 7/2007 | Niwano | 370/335 |
| 2008/0037474 A1* | 2/2008 | Niwano | 370/335 |

OTHER PUBLICATIONS

International Search Report PCT/US2005/002307 International Search Authority European Patent Office May 17, 2005.

International Preliminary Report on Patentability PCT/US2005/002307, IPEA/US Jul. 24, 2006.

Written Opinion PCT/US2005/002307, International Search Authority European Patent Office, Jul. 23, 2006.

* cited by examiner

METHOD AND APPARATUS FOR CHANNEL SENSITIVE SCHEDULING IN A COMMUNICATION SYSTEM

CLAIM OF PRIORITY UNDER 35 U.S.C. §120

The present Application for patent claims priority of U.S. Provisional Application No. 60/538,983, filed Jan. 23, 2004, assigned to the assignee hereof and hereby expressly incorporated by reference herein.

BACKGROUND

1. Field

The present invention pertains generally to communications, and more specifically to a method and apparatus for channel sensitive scheduling of transmissions in a communication system.

2. Background

Communication systems, and wireless systems in particular, are designed with the objective of efficient allocation of resources among a variety of users. Wireless system designers in particular aim to provide sufficient resources to satisfy the communication needs of its subscribers while minimizing costs. Various scheduling algorithms have been developed, each based on a predetermined system criteria.

In a wireless communication system employing a Code Division-Multiple Access (CDMA) scheme or Wideband Code Division Multiple Access (WCDMA) one scheduling method assigns each of the subscriber units code channels at designated time intervals on a time multiplexed basis. A central communication node, such as a Base Station (BS) or Node B, implements the unique carrier frequency or channel code associated with the subscriber to enable exclusive communication with the subscriber. TDMA schemes may also be implemented in landline systems using physical contact relay switching or packet switching. A CDMA system may be designed to support one or more standards such as: (1) the "TIA/EIA/IS-95-B Mobile Station-Base Station Compatibility Standard for Dual-Mode Wideband Spread Spectrum Cellular System" referred to herein as the IS-95 standard; (2) the standard offered by a consortium named "3rd Generation Partnership Project" referred to herein as 3GPP; and embodied in a set of documents including Document Nos. 3G TS 25.211, 3G TS 25.212, 3G TS 25.213, and 3G TS 25.214, 3G TS 25.302, referred to herein as the W-CDMA standard; (3) the standard offered by a consortium named "3rd Generation Partnership Project 2" referred to herein as 3GPP2, and TR-45.5 referred to herein as the cdma2000 standard, formerly called IS-2000 MC, or (4) some other wireless standard. A WCDMA system may be designed to support one of more of the same standards listed above for a CDMA system.

WCDMA is an interference-limited system, which means that neighboring cells and other users limit the uplink and downlink capacity of any single cell. To maximize capacity, interference (other signal power) should be minimized. This includes minimizing signal-to-interference ($E_b/N_o$) requirements, minimizing overhead channel power, and minimizing control-only channel power. In addition, good phone performance includes long battery life. To achieve this goal, the phone should minimize its power during dedicated channel transmission and monitoring of overhead channels.

Accordingly, there is a need for a method and apparatus for channel sensitive scheduling of transmissions in a communication system with application to multiple classes of users.

SUMMARY

Embodiments disclosed herein address the above stated needs by providing a means for channel sensitive scheduling of data transmissions in a wireless communication system. One embodiment provides a method of scheduling transmissions in a wireless communication system, comprising: receiving a channel condition indicator sent by a mobile station at a scheduler, determining a priority value for the mobile station using a function:

$$\text{Priority}(i) = \text{Pilot\_Power\_Max} - \text{Pilot\_Power}(i),$$

where Priority(i) is the priority value for the ith mobile user, Pilot_Power_Max is the mobile station's maximum pilot power, and Pilot_Power(i) is the mobile station's pilot power at time of scheduling.

Another embodiment provides for calculating priority values for a plurality of mobile stations as a function of the channel condition indicator; and selecting at least one of the plurality of mobile stations for a subsequent transmission based on the priority value. Additional embodiments may be based upon the mobile station's transmit pilot power and requested data rate. The mobile station's transmit power may be determined based upon power control commands in an additional embodiment.

Further embodiments provide different functions for computing priority values. One further embodiment provides a method of scheduling in a wireless communication system, comprising: receiving a channel condition indicator sent by a mobile station at a scheduler, determining a priority value for the mobile user using a function:

$$\text{Priority}(i) = a(i) * (\text{Pilot\_Power\_Average}(i)/\text{Pilot\_Power}(i))$$

where Priority(i) is a priority value for an i-th mobile user, Pilot_Power_Average(i) is a mobile station's pilot power averaged over a certain period of time, Pilot_Power(i) is a mobile station's pilot power at the moment of scheduling, and a(i) is a weighting factor.

Still further embodiments provide for the weighing factor to be based upon the mobile station's speed. Yet another embodiment provides for computation of the weighing factor according to the function:

$$a(i) = (\text{sector\_throughput}/\text{user\_throughput}(i))^b, \text{ where } 0 \leq b \leq 1.$$

In another embodiment, a computer-readable medium including computer-executable instructions for scheduling transmissions, comprising: processing channel condition indicators received from a plurality of mobile stations; calculating a priority value for each of a plurality of mobile stations; determining a transmission schedule for the plurality of mobile stations as a function of the priority value. Another embodiment provides a function for calculating the priority value:

$$\text{Priority}(i) = \text{Pilot\_Power\_Max} - \text{Pilot\_Power}(i),$$

where Priority(i) is the priority value for the ith mobile station, Pilot_Power_Max is the mobile station's maximum pilot power, and Pilot_Power(i) is the mobile user's pilot power at time of scheduling.

Still another embodiment provides a computer program wherein calculating a priority value uses the function:

$$Priority(i)=a(i)*(Pilot\_Power\_Average(i)/Pilot\_Power(i))$$

where Priority(i) is a priority value for an i-th mobile station, Pilot_Power_Average(i) is the mobile station's pilot power averaged over a certain period of time, Pilot_Power(i) is the mobile station's pilot power at the moment of scheduling, and a(i) is the weighting factor.

A further embodiment provides for calculating the weighting factor is computed according to a function:

$$a(i)=(sector\_throughput/user\_throughput(i))^b, \text{ where } 0 \leq b \leq 1.$$

Still another embodiment provides a network, comprising: receiving means for receiving channel condition indicators from a plurality of mobile users; means for determining a priority value for each mobile station; means for determining a transmission schedule for a plurality of mobile users, based on the priority value.

An additional embodiment provides for a network wherein the computation of the priority value is a function of:

$$Priority(i)=Pilot\_Power\_Max-Pilot\_Power(i),$$

where Priority(i) is the priority value for the ith mobile station, Pilot_Power_Max is the mobile station's maximum pilot power, and Pilot_Power(i) is the mobile station's pilot power at time of scheduling.

An additional embodiment provides a network wherein the computation of the priority value is a function of:

$$Priority(i)=a(i)*(Pilot\_Power\_Average(i)/Pilot\_Power(i))$$

where Priority(i) is a priority value for an i-th mobile station, Pilot_Power_Average(i) is the mobile station's pilot power averaged over a certain period of time, Pilot_Power(i) is the mobile station's pilot power at the moment of scheduling, and a(i) is the weighting factor.

Yet another embodiment provides for a network, wherein the weighting factor is computed according to the function:

$$a(i)=(sector\_throughput/user\_throughput(i))^b, \text{ where } 0 \leq b \leq 1.$$

An additional embodiment provides an apparatus in a wireless communication system, comprising: a processing element; and a memory storage element coupled to the processing element, the memory storage element adapted for storing computer-readable instructions for implementing: means for receiving a channel condition indicator from a plurality of mobile stations; means for computing a priority value for each mobile station based on the channel condition indicator; and means for scheduling the plurality of mobile stations based on the computed priority values.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION OF THE INVENTION

Figure 1:
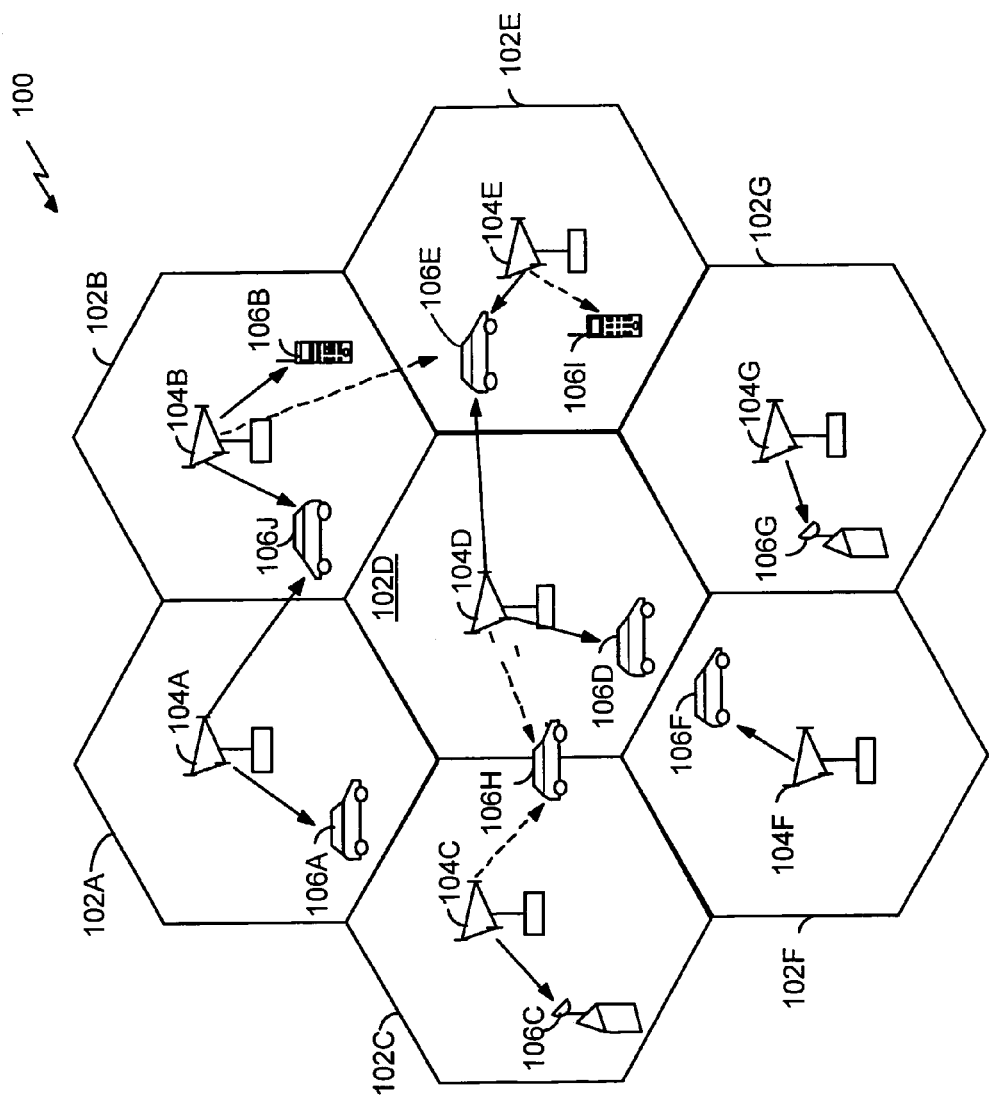
FIG. 1 is a wireless communication system according to an embodiment of the invention.

A modern day communication system is desired to support a variety of applications. One such communication system is a code division multiple access (CDMA) system which conforms to the "TIA/EIA-95 Mobile Station-Base Station Compatibility Standard for Dual-Mode Wideband Spread Spectrum Cellular System" and its progeny, hereinafter referred to as IS-95. The CDMA system allows for voice and data communications between users over a terrestrial link. Another communication system is a wideband code division multiple access (WCDMA) system. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

In a CDMA system or WCDMA system, communications between users are conducted through one or more base stations. In wireless communication systems, forward link refers to the channel through which signals travel from a base station to a subscriber station, and reverse link refers to the channel through which signals travel from a subscriber station to a base station. By transmitting data on a reverse link to a base station, a first user on one subscriber station communicates with a second user on a second subscriber station. The base station receives the data from the first subscriber station and routes the data to a base station serving the second subscriber station. Depending on the location of the subscriber stations, both may be served by a single base station or multiple base stations. In any case, the base station serving the second subscriber station sends the data on the forward link. Instead of communicating with a second subscriber station, a subscriber station may also communicate with a terrestrial Internet through a connection with a serving base station. In wireless communications such as those conforming to IS-95, forward link and reverse link signals are transmitted within disjoint frequency bands.

WCDMA systems use slightly different terminology than CDMA systems. There are three major subsystems in a WCDMA system. User Equipment (UE) may be a mobile, a fixed station, a data terminal or other device. A UE includes a Universal Subscriber Identity Module (USIM) which contains a user's subscription information. The Access Network (AN) includes the radio equipment for accessing the network. It may be either Universal Terrestrial Radio Access Network (UTRAN) or Global System for Mobile communications/ Enhanced Data rates for GSM Evolution (GSM/EDGE) Radio Access Network (GSM/EDGE RAN). The Core Network (CN) includes the switching and routing capability for connecting to either the Public Switched Telephone Network (PSTN) for circuit switched calls or to a Packet Data Network (PDN) for packet switched calls. The Core Network also includes mobility and subscriber location management and authentication services.

FIG. 1 serves as an example of a communications system 100 that supports a number of users and is capable of implementing at least some aspects and embodiments presented herein. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention.

The downlink refers to transmission from the base station to the terminal, and the uplink refers to transmission from the terminal to the base station. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. As the amount of data transmitted and the number of transmissions increases, the limited bandwidth available for radio transmissions becomes a critical resource. Additionally, interference becomes a significant problem. Channel conditions may affect which transmissions may be sent efficiently. There is a need, therefore, for a channel sensitive means of scheduling transmissions in a wireless communication system. In the exemplary embodiment, system 100 illustrated in FIG. 1 is consistent with a WCDMA type system having High Data Rate (HDR) service.

A WCDMA system manages data transmission using the Medium Access Control (MAC) layer of the system architecture. Data transmission utilizes the selection of a Transport Format Combination (TFC). TFC selection is performed by the MAC layer. For each radio frame, the Physical Layer requests data from the MAC layer. The MAC queries the Radio Link Control (RLC) to determine how much data is available to send in order to determine how much data the MAC layer can deliver to the Physical Layer for transmission. The Transport Format Combination Indicator (TFCI) represents the TFC in use. As an example, consider a packet switched data call. The Physical Layer channel is configured to carry variable length frames up to a maximum data rate. Based on available data on the RLC logical channels, MAC selects a transport format combination that ultimately determines the data rate of the physical channel on a frame by frame basis.

Signaling data is intermittent, so often there will be no Protocol Data Units (PDU) available to send on the Signal Radio Bearers (SRB). Alternatively, there may be data available for transport on multiple SRBs at the same time. In the latter case, the MAC uses logical channel priorities to determine which SRB will send the data.

Packet switched data is inherently bursty, so the amount of data available to send may vary from frame to frame. When more data is available, MAC may choose a higher data rate. When both signaling and user data are available, MAC should choose between them to maximize the amount of data sent from the higher priority channel.

A Transport Block is the basic unit of data exchanged between the MAC and the Physical Layer. A Transport Block is a set of zero or more transport blocks. For a given transport channel, the physical layer requests data from the MAC every Transmission Time Interval (TTI). The advantage of breaking a large block of data into a set of smaller blocks is that each of the smaller blocks can have a separate Cyclic Redundancy Check (CRC). An error may occur in one block, leaving other blocks unaffected. If there was only one CRC for a large block of data, a single error could cause the entire block to be discarded.

A Transport Format defines the transport block size and number of blocks that MAC may deliver to the physical layer during a TTI. The Transport Format Set defines all of the valid Transport Formats for each transport channel. For example, to support a 57.6 kbps circuit switch radio access bearer for streaming data, the transport block size is 576 bits, with up to four blocks that could be sent in one transport block, with a 49 ms TTI. The Transport Formats are labeled from TF0 to TF3 for the example above.

Multiple transport channels may be multiplexed onto a Coded Composite Transport Channel (CCTrCh). Each transport channel has a Transport Format Set defined for it. A Transport Format Combination (TFC) defines a combination of Transport Formats, one for each transport channel, which can be used simultaneously across the transport channels mapped to a CCTrCh. For example, TFC for each typical voice configuration selects one block from each of the dedicated channels (DCH) to which the circuit switched radio access bearer (CS RAB) subflows are mapped and one block from the DCH to which the four SRBs are mapped.

As part of the CCTrCh configuration, MAC is given a Transport Format Combination Set (TFCS). The TFCS lists all of the allowed TFCs for that CCTrCh. At each radio frame boundary, MAC is responsible for selecting a TFC from the TFCS. MAC bases this choice on the buffer status of each logical channel, the relative priorities of each logical channel, and quality of service parameters for each logical channel. Depending on the nature of each logical channel, MAC may deal in a different manner with data that could not be sent at a particular TTI boundary. For example, non-realtime data may be queued for future transmission, while data for streaming video may be discarded.

The Transport Format Combination Indicator (TFCI) is the index into the TFCS for a particular TFC. The physical channel may be configured to transmit the TFCI in each radio frame, allowing the receiver to quickly determine the TFC that was used in each radio frame.

Every minimum TFI, MAC performs Transport Format Combination (TFC) selection to determine the number of bits to be transmitted from each transport channel. When the transport blocks are delivered to the physical layer for transmission, MAC indicates which TFC was chosen. MAC represents the TFC using a Transport Format Combination Indicator (TFCI), which is then transmitted on the dedicated physical control channel.

Figure 2:
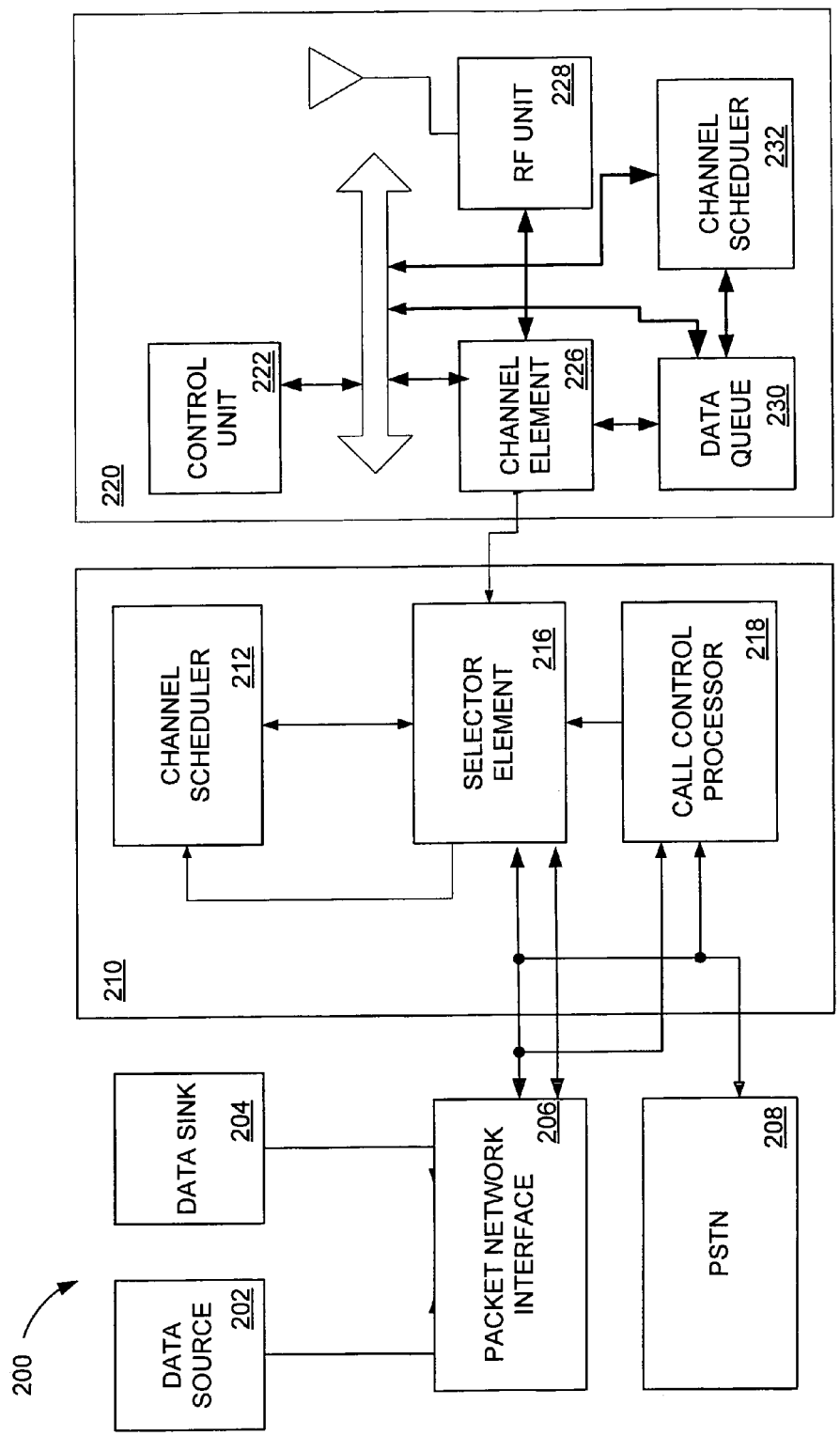
FIG. 2 is a wireless communication system supporting a channel sensitive scheduling algorithm.

One example of a communication system supporting data transmissions and adapted for scheduling transmissions to multiple users is illustrated in FIG. 2. FIG. 2 illustrates the operation of the base stations 104 from FIG. 1. FIG. 2 is detailed hereinbelow, wherein specifically, a base station, or Node B, 220 and base station controller 210 interface with a packet network interface 206. Base station controller 210 includes a channel scheduler 212 for implementing a scheduling algorithm for transmissions in system 200. The channel scheduler 212 determines TTI during which data is to be transmitted as described above.

In addition, the channel scheduler 212 selects the particular data queue for transmission. The associated quantity of data to be transmitted is then retrieved from a data queue 230 and provided to the channel element 226 for transmission to the remote station associated with the data queue 230. As discussed below, the channel scheduler 212 selects the queue for providing the data, which is transmitted in a following TTI.

Note that it may be possible for the user to receive a packet correctly even if only a portion of the packet is transmitted. This occurs when the channel condition is better than anticipated by the user. In that case, the user may send an "ACK" signal to the base station indicating that the packet is already correctly received and the remaining portions of the packet need not be transmitted. When this happens, the entire data packet is effectively transmitted to the user over a shorter service interval thereby increasing the effective data rate at which the packet is transmitted. The base station then reassigns the time slots that were originally scheduled to transmit the remaining portions of that packet to transmit another packet either to the same user or to a different user. This process is generally referred to as Automatic Repeat reQuest (ARQ).

In a system supporting ARQ, a data packet is scheduled for a predetermined number of transmissions, wherein each transmission may include different information. The multiple transmissions are interposed with other packets sequentially. When a receiver has received sufficient information to decode and process the packet, the receiver sends an indication to the transmitter that no further information is needed for the current packet. The transmitter is then free to schedule the slots originally scheduled for the current packet to another packet. In this way, the system resources are conserved and the transmission time to the receiver is reduced.

A block diagram illustrating the basic subsystems of an exemplary variable rate communication system is shown in FIG. 2. Base station controller 210 interfaces with packet network interface 206, Public Switched Telephone Network, PSTN, 208, and all base stations or Node Bs in the communication system (only one base station 220 is shown in FIG. 2 for simplicity). Base station controller 210 coordinates the communication between remote stations in the communication system and other users connected to packet network interface 206 and PSTN 208. PSTN 208 interfaces with users through a standard telephone network (not shown in FIG. 2).

Base station controller 210 may contain many selector elements 216, although only one is shown in FIG. 2 for simplicity. Each selector element 216 is assigned to control communication between one or more base stations or Node Bs 220 and one remote station (not shown). If selector element 216 has not been assigned to a given remote station, call control processor 218 is informed of the need to page the remote station. Call control processor 218 then directs base station 220 to page the remote station.

Data source 202 contains a quantity of data, which is to be transmitted to a given remote station. Data source 202 provides the data to packet network interface 206. Packet network interface 206 receives the data and routes the data to the selector element 216. Selector element 216 then transmits the data to each base station 220 in communication with the target remote station. In the exemplary embodiment, each base station 220 maintains a data queue 230, which stores the data to be transmitted to the remote station.

The data is transmitted in data packets from data queue 230 to channel element 226. In the exemplary embodiment, on the forward link, a "data packet" refers to a quantity of data which is a maximum of 1024 bits and a quantity of data to be transmitted to a destination remote station within a predetermined "time slot" (such as ≈1.667 msec). For each data packet, channel element 226 inserts the necessary control fields. In the exemplary embodiment, channel element 226 performs a Cyclic Redundancy Check, CRC, encoding of the data packet and control fields and inserts a set of code tail bits. The data packet, control fields, CRC parity bits, and code tail bits comprise a formatted packet. In the exemplary embodiment, channel element 226 then encodes the formatted packet and interleaves (or reorders) the symbols within the encoded packet. In the exemplary embodiment, the interleaved packet is covered with a Walsh code, and spread with the short PNI and PNQ codes. These PNI and PNQ codes are well known in CDMA wireless systems. The spread data is provided to RF unit 228 which quadrature modulates, filters, and amplifies the signal. The forward link signal is transmitted over the air through an antenna to the forward link and to the mobile station or UE.

At the remote station, the forward link signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at base station 220, specifically the de-interleaving, decoding, and CRC check functions. The decoded data is provided to a data sink.

The hardware, as pointed out above, supports variable rate transmissions of data, messaging, voice, video, and other communications over the forward link. The rate of data transmitted from the data queue 230 varies to accommodate changes in signal strength and the noise environment at the remote station, or UE. The UEs send information concerning receipt of the data, including ACK/NACK messages to the Node B. In addition, information on transmission power is also transmitted. Accordingly, circuitry at the remote station measures the signal strength and estimates the noise environment at the remote station to determine the rate information for future transmission.

The signal transmitted by each UE travels through a reverse link channel and is received at base station 220 through a receive antenna coupled to RF unit 228. In the exemplary embodiment, the pilot power and data rate information is demodulated in channel element 226 and provided to a channel scheduler 212 located in the base station controller 210 or to a channel scheduler 232 located in the base station 220. In a first exemplary embodiment, the channel scheduler 232 is located in the base station 220. In an alternate embodiment, the channel scheduler 212 is located in the base station controller 210, and connects to the selector elements 216 within the base station controller 210.

In the first-mentioned exemplary embodiment, channel scheduler 232 receives information from data queue 230 indicating the amount of data queued up for each remote station, also called "queue size". Channel scheduler 232 then performs scheduling based on channel condition for each UE serviced by base station 220. If queue size is utilized for a scheduling algorithm used in the alternate embodiment, channel scheduler 212 may receive queue size information from selector element 216.

During the transmission of a packet to one or more users, the users transmit an "ACK" signal after each time slot containing a portion of the transmitted packet. The ACK signal transmitted by each user travels through a reverse link channel and is received at base station 220 through a receive antenna coupled to RF unit 228. In the exemplary embodiment, the ACK information is demodulated in channel element 226 and provided to a channel scheduler 212 located in the base station controller 210 or to a channel scheduler 232 located in the base station 220. In a first exemplary embodiment, the channel scheduler 232 is located in the base station 220. In an alternate embodiment, the channel scheduler 212 is located in the base station controller 210, and connects to all selector elements 216 within the base station controller 210.

Embodiments of the present invention are applicable to other hardware architectures, which can support variable rate transmissions. The present invention can be readily extended to cover variable rate transmissions on the reverse link. For example, the base station 220 measures the strength of the signal received from the remote stations and estimates the noise environment and power requirements to determine a rate of receiving data from the remote station. The base station 220 then transmits to each associated remote station the rate at which data is to be transmitted in the reverse link from the remote station. The base station 220 may then schedule transmissions on the reverse link based upon the different data rates on the reverse link in a manner similar to that described herein for the forward link.

Also, a base station 220 of the embodiment discussed above transmits to a selected one, or selected ones, of the remote stations to the exclusion of the remaining remote stations associated with the base station or Node B 220 using a Code Division-Multiple Access, CDMA, scheme or a WCDMA scheme. At any particular time, the base station 220 transmits to the selected one, or selected ones, of the remote station by using a code, which is assigned, to the receiving base station(s) or Node Bs 220. However, this scheme is also applicable to other systems employing different Time Division-Multiple Access, TDMA, methods for providing data to select base station(s) 220, to the exclusion of the other base stations 220, for allocating transmission resources optimally.

The channel scheduler 212 schedules the variable rate transmissions on the forward link. The channel scheduler 212 receives the queue size, which is indicative of the amount of data to transmit to a remote station, and messages from remote stations. The channel scheduler 212 preferably schedules data transmissions to achieve the system goal of maximum data throughput while minimizing interference.

As shown in FIG. 1, remote stations are dispersed throughout the communication system and can be in communication with zero or one base station or Node B on the forward link. In the exemplary embodiment, channel scheduler 212 coordinates the forward link data transmissions over the entire communication system. A scheduling method and apparatus for high speed data transmission are described in detail in U.S. patent application Ser. No. 08/798,951, entitled "Method and Apparatus for Forward Link Rate Scheduling," filed Feb. 11, 1997, assigned to the assignee of the present invention and hereby expressly incorporated by reference.

According to an embodiment, the channel scheduler 212 is implemented in a computer system, which includes a processor, Random Access Memory, RAM, and a program memory for storing instructions to be executed by the processor (not shown). The processor, RAM and program memory may be dedicated to the functions of the channel scheduler 212. In other embodiments, the processor, RAM and program memory may be part of a shared computing resource for performing additional functions at the base station controller 210. In the exemplary embodiment, a generalized scheduler is applied to the system 200 illustrated in FIG. 2 and is detailed hereinbelow. Those modules within the BSC 210 and BS 220 used to implement a channel sensitive scheduling function for scheduling data transmissions is discussed below.

Given the growing demand for wireless data applications, the demand for very efficient wireless data communication systems has increased significantly. The IS-95 standard is capable of transmitting traffic data and voice data over the forward and reverse links. In accordance with the IS-95 standard, the traffic data or voice data is partitioned into code channel frames that are 20 milliseconds wide with data rates as high as 14.4 Kbps. In an IS-95 system, each subscriber station is allocated at least one of a limited number of orthogonal forward link channels. While the communication between a base station and a subscriber station is ongoing, the forward link channel remains allocated to the subscriber station. When data services are provided in an IS-95 system, a forward link channel remains allocated to a subscriber station even during times when there is no forward link data to be sent to the subscriber station.

A significant difference between voice services and data services is the fact that the former typically imposes stringent and fixed delay requirements. Typically, the overall one-way delay of speech frames are specified to be less than 100 milliseconds. In contrast, the data delay can become a variable parameter used to optimize the efficiency of the data communication system.

Yet another significant difference between voice services and data services is that the former typically requires a reliable communication link which, in the exemplary CDMA or WCDMA communication system, is provided by soft handoff. Soft handoff results in redundant transmissions from two or more base stations to improve reliability. However, this additional reliability is not required for data transmission because the data packets received in error can be retransmitted. For data services, the transmit power used to support soft handoff can be more efficiently used for transmitting additional data.

Transmission delay required to transfer a data packet and the average throughput rate are two attributes used to define the quality and effectiveness of a data communication system. Transmission delay usually does not have the same impact in data communication as it does for voice communication, but it is an important metric for measuring the quality of the data communication system. The average throughput rate is a measure of the efficiency of the data transmission capability of the communication system. Throughput rate is also affected by the amount of power required for transmission. There is a need for a channel sensitive method of scheduling transmissions based on power requirements. Power requirements in a wireless communication system as discussed below.

WCDMA is an interference-limited system, which means neighboring cells and other users limit the uplink and downlink capacity of any single cell. To maximize capacity, other signal power, which produces interference, must be minimized. This includes minimizing signal-to-interference (Eb/No) requirements, minimizing overhead channel power, and minimizing control-only channel power. Good mobile phone performance includes long battery life. To accomplish this, the mobile phone must minimize its power during dedicated channel transmission, monitoring overhead channels, and transmitting using the minimum power setting for transmission.

A robust CDMA or WCDMA system requires good power control. Power control minimizes the transmit power of the mobile or UE and the network. Because CDMA and WCDMA systems are interference limited, reducing the power from all users increases the capacity of the system. Inefficiencies in power control reduce overall system capacity.

The most basic problem in power control is the near-far problem. Close-in transmitters are heard more easily than transmitters further away. Power control causes these transmitters to transmit at such a power level that their received signal is the same or nearly the same as a transmitter located further away.

Efficient power control requires fast feedback to minimize system capacity loss. Fast power control is known as inner loop power control and runs at 1500 Hz. Thus, the transmitter gets commands 1500 times a second from the receiver to increase or decrease power.

For voice calls good quality of service is near a 1% block error rate (BLER). To maintain a 1% BLER, a certain signal-to-interference (SIR) may be required. If the user is in a bad fading environment, such as moving fast in a cluttered environment, then the user needs a higher SIR target than a user in a better fading environment, such as moving slowly in a clutter-free environment. Because both users require a 1% BLER, the power control must find the correct SIR target. The process of finding the correct SIR target is called outer loop power control. Differences in SIR targets cause differences in receive power.

A closed loop process controls transmission power on both the downlink and uplink. Closed loop power control is a three step process. A transmission is made, a measurement is made at the receiver, and feed is provided to the transmitter indicating whether the power should be increased or decreased.

The closed loop process can eventually correct the mobile or UE's transmit power regardless of the initial transmit level. Significant gain can be achieved if the UE's initial transmit level is close to the appropriate power. Selection of a metric is affected by the speed required of the closed loop process. Block error rate (BLER) is a good metric, however, measuring BLER can be a time consuming process. If a faster response is needed, Eb/No, may be a better selection. For quick response to power control commands, multiple commands are sent every radio frame.

Figure 3:
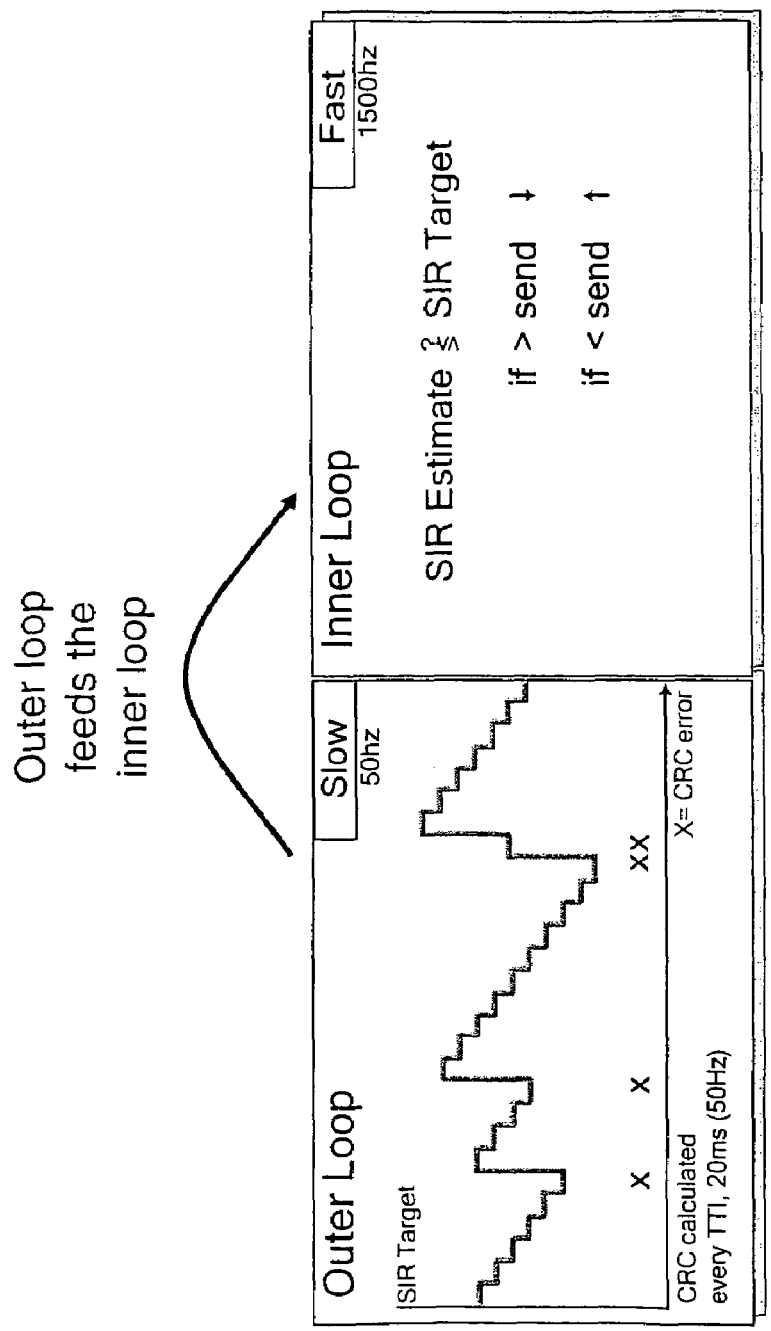
FIG. 3 illustrates the interaction of outer and inner loop power control in a wireless communication system.

FIG. 3 shows the interaction of the outer loop and inner loop control mechanisms. An SIR target algorithm based on BLER may be adjusted slowly. Since BLER is based on cyclic redundancy checks (CRC), and adaptive multi-rate (AMR) voice CRCs are received on 20 ms transmission time interval (TTI), the fastest that the outer loop power control can be adjusted is 50 times per second.

Inner loop power control utilizes the SIR estimate. The SIR estimate is usually calculated every slot (15 times per 10 ms radio frame), since the dedicated physical control channel pilot power is present in every shot. The inner loop is given the SIR target. If the SIR estimate is greater than the SIR target, the inner loop signals for a decrease in transmitter power. If the SIR target is less than the SIR target, the inner loop signals for an increase in transmitter power. This happens quickly, approximately 1500 times per second to rapidly compensate for quickly changing fading conditions.

The inner loop and outer loop interact. The inner loop uses a slowly changing SIR target. The outer loop delivers the SIR target to the inner loop. See FIG. 3 for a depiction of this interaction.

The UE performs its own downlink closed loop power control algorithm. The UE may measure the BLER over a number of frames and increases and decreases the SIR target. Based on the SIR target and the SIR estimate, the UE directs the universal terrestrial radio access network (UTRAN) to increase or decrease the UE's dedicated channel transmit power. The range of power adjustment for a Node B is typically around 20 db.

The downlink or inner loop power control runs at either 1500 or 500 Hz. The power control command is communicated to the UE and is sent quickly to respond to changing channel conditions. When there are multiple Node Bs, the UE is sending a single up or down command to multiple Node Bs. A weaker link may be told to decrease power, which will reduce the overall interference of the system. If a stronger Node B signal degrades, the UE signals a power increase command. Upon receipt of the power up command, all Node Bs increase their downlink power.

Uplink power control varies from the downlink power control described above. UEs may be located anywhere within the cell. One UE may be thousands of meters away from the cell, while another UE may be only a few hundred meters away. Thus, users experience greatly varying amounts of path loss due to their varying distance from the cell and their varying multipath environments. Path loss can exceed 80 db for example. Each UE must be carefully power controlled to ensure that transmission arrive at the cell at an appropriate level, including initial transmissions, to minimize interference to other users. For initial power settings, the UE uses an open loop estimate. For the open loop estimation the UE receives signaled parameters and makes channel measurements. During the close loop power control operation the UE is provided feedback that minimizes its interference.

A UE involved in a soft handover may receive conflicting power control commands from the different Node Bs. The UE resolves the conflict by applying a simple rule: if any Node B commands the UE to reduce power, the UE will reduce power. This is called the "OR of downs". In the event of a multi-cell (same Node B) handoff, the UE should receive identical commands from the two cells. Knowing this, the UE "soft combines" the bits before making a decision on the value of the bit. Here, there is no OR of the downs because if the signal is from two cells but the same Node B, the signal likely experiences the same general fading environment. The UE can tell if the two radio links are from the same Node B based on the TPC index, as discussed previously.

Figure 4:
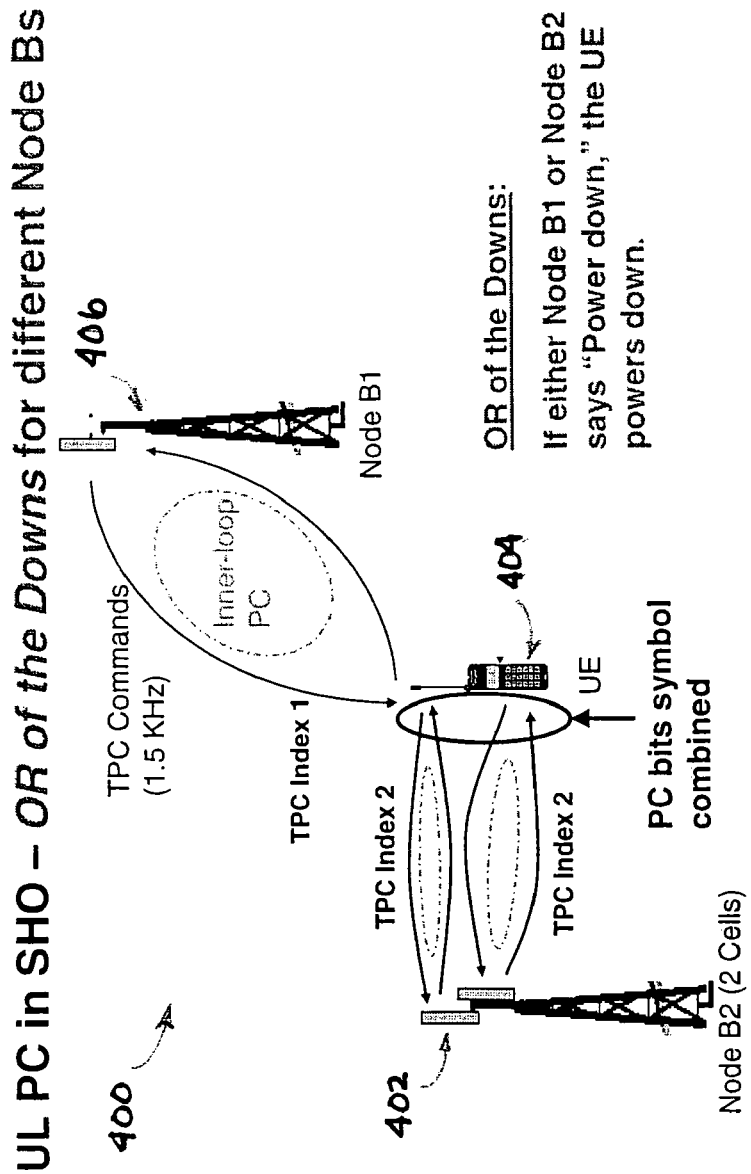
FIG. 4 illustrates power control for a User Equiment (UE) during soft handover.

FIG. 4 illustrates a UE in soft handover. A UE 404, is in soft handover with Node B1 406 and Node B2 402. The system 400 includes both Node Bs and the UE.

During handover, there can be up to six sets of TPC indices, one index from each Node B. If the TPC index is the same, it means those cells correspond to the same Node B. If the Node Bs are different, then the TPC indices will be different. The UE powers down if any of the Node Bs transmit a power down command.

The embodiments described herein are applicable to a variety of scheduling algorithms and prioritizations, and is not limited to those described herein. For clarity, several scheduling algorithms will be discussed to provide examples of a generalized scheduler and various implementations.

Embodiments of the present invention are directed to a system and apparatus for scheduling transmissions based on channel sensitive scheduling.

Channel sensitive scheduling depends upon some enhancements to the uplink portion of the WCDMA system. The uplink transmissions can be scheduled by the Node B and physical frames retransmitted and soft combined. The TTI may be 2 ms, which is used for UEs that are not in soft handover. For UEs in soft handover, a TTI of 10 ms may be used. However, the network decides which UE is assigned 10 ms and which UE to assign 2 ms.

Short TTI enable channel sensitive scheduling. Channel sensitive scheduling can significantly increase uplink throughput and reduce delay. Any practical scheduling algorithm should provide at least some fairness, in order to ensure that every UE in the system receives at least some throughput. UEs are scheduled when their transmit power is low compared to the average transmitted power, thus minimizing interference to the system, delay, and maximizing throughput.

Figure 5:
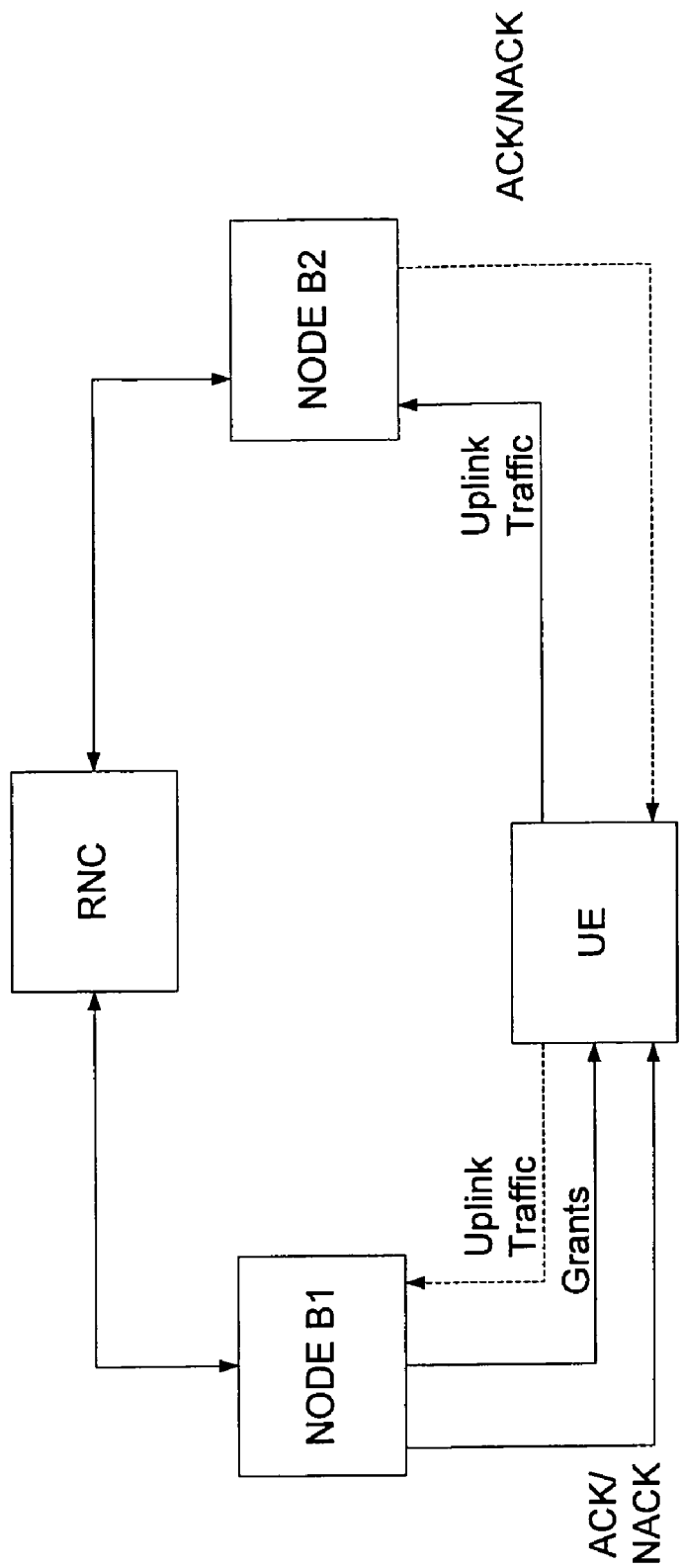
FIG. 5 illustrates uplink scheduling

FIG. 5 shows a UE on the uplink that is in soft handover with Node B1 and Node B2. A single Node B is the serving node. Only the serving Node B schedules the uplink traffic. In the example shown in FIG. 5, Node B1 is the serving node and schedules uplink traffic. All Node Bs in soft handover decode physical layer frames and acknowledge successful decoding of a physical layer frame. Any needed retransmissions are synchronous and follow the first transmission at a predetermined time interval. Soft combining of the retransmissions is performed at the Node B. The radio network controller (RNC) is aware of the serving node for each UE.

The objective of channel sensitive scheduling is to reduce interference to other cells and to better utilize the available uplink resources, resulting in higher throughput and lower delay. UEs are scheduled when the channel condition is good. When the channel condition is good, the transmitted pilot power is low and interference toward other cells is less for the same amount of data transmitted. Only the first sub-packet is scheduled. Any retransmissions needed are transmitted at a pre-determined time shortly after the initial transmission and are not independently scheduled. This is because of the nature of the hybrid ARQ method, which fixes the time for any retransmissions.

The hybrid ARQ method is employed because it is link efficient. Initial transmissions are not targeted to achieve the targeted frame or block error rate. Rather, the frame or block error rate is intended to be achieved after any needed retransmissions have occurred. The retransmissions in synchronous hybrid ARQ operation are defined in advance. For example, the maximum number of retransmissions allowed may be three. The retransmissions are scheduled at specific times in the transmission queue and those times are defined when the system is configured for operation. Therefore, the first retransmission can be scheduled according to channel conditions and scheduling the first retransmission automatically schedules the remaining retransmission instances.

The system operating point does not change with channel sensitive scheduling. A 1% to 5% frame error rate or block error rate remains in effect. To achieve that quality of service level a user may need may need to transmit with more power in poor channel conditions, or conversely, may be able to achieve that quality of service with a lower transmit power level. While the goal of channel sensitive scheduling is to schedule users with the lowest transmission power levels first, the power level is related to the user's requested data rate. A higher data rate generally requires more transmit power. For example, a user encountering good channel conditions and a user in bad channel conditions may have identical transmit power level requests. The user with better channel conditions would use a higher data rate for transmission, while the user in bad channel conditions would use a lower data rate. For improved throughput, the user with the higher data rate would then be scheduled ahead of the user with the lower data rate. However, if both users request the same data rate, then the user with better channel conditions would use less transmit power and would be scheduled ahead of the user in bad channel conditions who requires more transmit power to achieve the same data rate.

Figure 6:
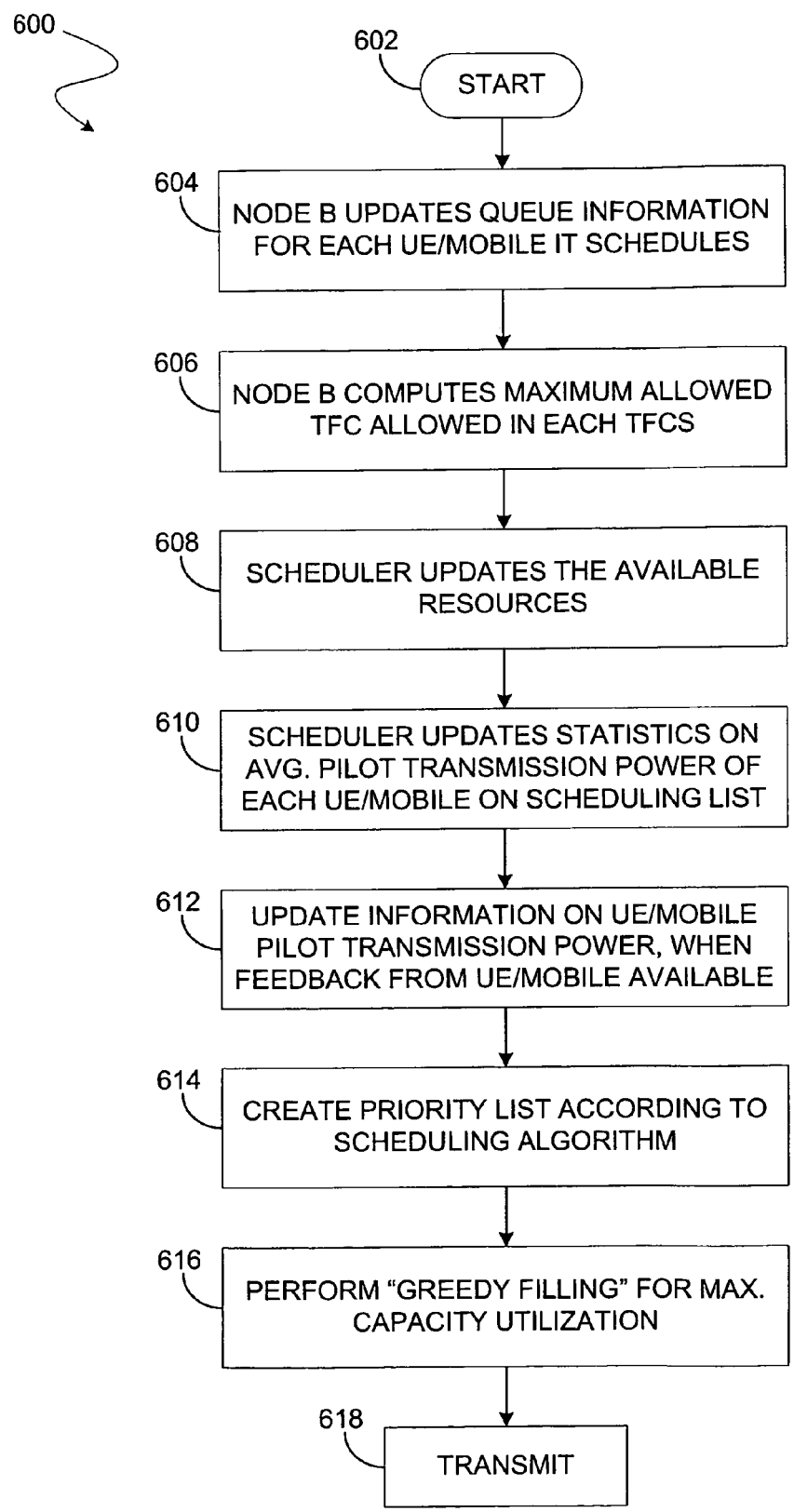
FIG. 6 is a flow diagram of a channel sensitive scheduler using greedy filling according to an embodiment of the invention.

FIG. 6 is a flow diagram explaining the method of the invention. The method, 600, begins with the start block, 602, with transmissions to schedule. The scheduler is located in the Node B and maintains a list of all UEs that are in soft handover with the Node B. The scheduler assigns transmission resources only to the UEs for which the Node B has the best downlink conditions.

Scheduling is initiated when the Node B updates queue information for each UE it schedules, step 604 in FIG. 6. The queue consists of the data that the UEs requesting to transmit for all the UEs scheduled by the Node B.

The scheduler computes the maximum TFC allowed in the TFCS for each UE to be scheduled in step 606. Computing the maximum TFC consists of the process described above and simplifies the computation of the maximum data rate.

At step 608 the scheduler updates the available resources. This involves the allowable rise over thermal for the wireless system and the preselected system operating point. For example, 4 dB may be the allowable rise over thermal for the sytem. The rise over thermal is based on the received power of each UE and includes an estimate of the interference seen by each UE. Also included is the contribution of autonomous transmissions and transmissions of the non-scheduled UEs that are in soft handover at the moment of estimation.

After completing the update estimate, the scheduler in step 610 updates the statistics on the average pilot transmission power of each UE on the scheduling list.

In step 612 the scheduler updates the information on the UE pilot transmission power, when the feedback is available. Once the update is completed the scheduler creates a priority list based on computations of the scheduling algorithm in step 614.

The scheduling algorithm has two major characteristics: prioritization of UE requests and greedy filling for maximum capacity utilization. The UE requests are prioritized according to the results of the priority function calculation. Each UE has a priority count associated with it. Initially the priority of a UE is set to zero. When a new UE enters the system which the Node B is serving or its buffer becomes non-empty after being idle due to the lack of data, its priority is set to min{PRIORITY$_j$, ∀i such that UE$_i$ has cell j as the primary cell}

At the moment of scheduling, the scheduler, located at the Node B, is aware of the pilot power level of all users it schedules. The scheduler creates a priority list by sorting the priority values, computed according to the following two alternative algorithms.

Compute Max Threshold according to:

$$\text{Priority}(i) = \text{Pilot\_Power\_Max} - \text{Pilot\_Power}(i)$$

where Priority(i) is the priority value for the i-th user, Pilot_Power_Max is the UE's maximum pilot power, and Pilot_Power(i) is the user's pilot power at the moment of scheduling.

Compute Average Threshold according to:

Priority($i$)=$a(i)$*(Pilot_Power_Average($i$)/Pilot_Power($i$))

where Priority(i) is the priority value for the i-th user, Pilot_Power_Average(i) is the user's pilot power averaged over a certain period of time, Pilot_Power(i) is the user's pilot power at the moment of scheduling, and is the weighting factor. The a(i) is chosen such that it reflects user's speed. Another alternative selection for a(i) is allow a(i) to reflect the user's throughput, so that the user receives some capacity and is not ignored in scheduling. Another alternative is that a(i) reflect user's throughput, so that the user is not starved. For example: a(i)=(sector_throughput/user_throughput(i))^b, where $0 \leq b \leq 1$;

a(i) takes a larger value for low speed users: most of the gain of channel sensitive scheduling is seen with low speed users since channel can be tracked and channel conditions do not change rapidly, allowing the scheduler to take advantage of the channel. Low speed users are prioritized over high speed users in order to better utilize channel conditions, increase throughput, and decrease delay.

Once the priority list in step 614, has been created the scheduler performs greedy filling in step 616. "Greedy filling" is a technique for maximum capacity of a channel. At this point the scheduler has created the priority list and the order of transmission for the UEs is known. The scheduler knows the amount of resources available, which is typically in the form of amount of rise over thermal. The scheduler takes the first UE on the priority list and notes the data rate requested. The scheduler assumes that the UE will take the maximum data rate available and then calculates the resulting rise over thermal for the requested data rate. If the amount of data to be transmitted does not require all of the available capacity, the scheduler then examines the next UE and determines if the remaining capacity can accommodate the second UE. This process continues as long as there are UEs to be scheduled and remaining capacity. If a UE cannot be completely fit into the remaining available capacity, then the data rate granted that UE is lowered until the capacity is filled. Thus, the last mobile scheduled may be assigned a lower data rate than requested.

Once the scheduler has completed the scheduling in step 616, the data is transmitted in step 618. Transmission occurs in the order determined by the scheduler in the Node B.

A variety of possible implementations of channel sensitive scheduling are possible. One embodiment provides for the user transmit power to be estimated at the scheduler using the power control commands sent on the downlink. As pointed out in FIG. 5, it is assumed that the scheduling cell is the serving cell. This assumption may be impaired due to power control command errors and the fact that a user in soft handover obeys power control commands from a non-serving Node B.

To combat this situation, occasional synchronization of the actual transmit power and the estimated transmit power is needed. This may be done by sending 4 bits containing the transmit power information sent every 20 ms.

Additionally, users in soft handover may need to send a feedback message to the serving cell that sent the power control command in order to avoid the drift of transmit power estimation that occurs when the non-serving cell power command is applied.

UEs can keep track of the average transmit power used and can be periodically configured by the serving Node B to send an indicator that informs the scheduler whether the current transmit power is above or below the average transmit power. This creates low overhead, since only 1 bit may be needed. This method may be used in conjunction with the transmit power estimation based on power control commands. Any discrepancies between the relative position of the estimated transmit power to the threshold and the reported position of the UE may be used to pinpoint the problem and invoke resynchronization of the actual transmit power and the estimated transmit power.

Thus, a novel and improved method and apparatus for scheduling transmissions in a communications system has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, programmable logic device, array of logic elements, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to the storage medium so as to read information from, and write information to, the storage medium. In the alternative, the storage medium may be integral to the processor. The processor and the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method of scheduling transmissions in a wireless communication system, comprising:
   receiving a channel condition indicator sent by a mobile station at a scheduler,
   determining a priority value for the mobile station using a function:

$$\text{Priority}(i) = \text{Pilot\_Power\_Max} - \text{Pilot\_Power}(i),$$

where Priority(i) is the priority value for the ith mobile user, Pilot_Power_Max is the mobile station's maximum pilot power, and Pilot_Power(i) is the mobile station's pilot power at time of scheduling.

2. The method of claim 1 further comprising:
   calculating priority values for a plurality of mobile stations as a function of the channel condition indicator; and
   selecting at least one of the plurality of mobile stations for a subsequent transmission based on the priority value.

3. The method of claim 1 wherein:
   the channel condition indicator is based upon the mobile station's transmit pilot power and requested data rate.

4. The method of claim 1 wherein:
   the channel condition indicator is based upon the mobile station's transmit power as determined by power control commands.

5. A method of scheduling in a wireless communication system, comprising:
   receiving a channel condition indicator sent by a mobile station at a scheduler,
   determining a priority value for the mobile user using a function:

$$\text{Priority}(i) = a(i) * (\text{Pilot\_Power\_Average}(i)/\text{Pilot\_Power}(i))$$

where Priority(i) is a priority value for an i-th mobile user, Pilot_Power_Average(i) is a mobile station's pilot power averaged over a certain period of time, Pilot_Power(i) is a mobile station's pilot power at the moment of scheduling, and a(i) is a weighting factor.

6. The method of claim 5 wherein:
   the weighting factor is based upon the mobile user's speed.

7. The method of claim 5 wherein:
   the weighing factor is computed according to a function:

$$a(i) = (\text{sector\_throughput}/\text{user\_throughput}(i))^b, \text{ where } 0 \leq b \leq 1.$$

8. A computer-readable medium containing computer-executable instructions for performing a method of scheduling transmissions, the method comprising:
   processing channel condition indicators received from a plurality of mobile stations;
   calculating a priority value for each of a plurality of mobile stations using a function:

$$\text{Priority}(i) = \text{Pilot\_Power\_Max} - \text{Pilot\_Power}(i),$$

where Priority(i) is the priority value for the ith mobile station Pilot_Power_Max is the mobile station's maximum pilot power, and Pilot_Power(i) is the mobile user's pilot power at time of scheduling; and
   determining a transmission schedule for the plurality of mobile stations as a function of the priority values.

9. A computer-readable medium containing computer-executable instructions for performing a method of scheduling transmissions, the method comprising:
   processing channel condition indicators received from a plurality of mobile stations;
   calculating a priority value for each of a plurality of mobile stations using a function:

$$\text{Priority}(i) = a(i) * (\text{Pilot\_Power\_Average}(i)/\text{Pilot\_Power}(i))$$

where Priority(i) is a priority value for an i-th mobile station, Pilot_Power_Average(i) is the mobile station's pilot power averaged over a certain period of time, Pilot_Power(i) is the mobile station's pilot power at the moment of scheduling, and a(i) is the weighting factor; and
   determining a transmission schedule for the plurality of mobile stations as a function of the priority values.

10. The computer-readable medium as in claim 9, wherein the weighting factor is computed according to a function:

$$a(i) = (\text{sector\_throughput}/\text{user\_throughput}(i))^b, \text{ where } 0 \leq b \leq 1.$$

11. An apparatus, comprising:
    means for receiving channel condition indicators from a plurality of mobile stations;
    means for determining a priority value for each mobile station, wherein the priority value is a function of:

$$\text{Priority}(i) = \text{Pilot\_Power\_Max} - \text{Pilot\_Power}(i),$$

where Priority(i) is the priority value for the ith mobile station Pilot_Power_Max is the mobile station's maximum pilot power, and Pilot_Power(i) is the mobile station's pilot power at time of scheduling; and
    means for determining a transmission schedule for the plurality of mobile stations based on the priority values.

12. An apparatus, comprising:
    means for receiving channel condition indicators from a plurality of mobile stations;
    means for determining a priority value for each mobile station, wherein the priority value is a function of:

$$\text{Priority}(i) = a(i) * (\text{Pilot\_Power\_Average}(i)/\text{Pilot\_Power}(i))$$

where Priority(i) is a priority value for an i-th mobile station, Pilot_Power_Average(i) is the mobile station—s pilot power averaged over a certain period of time Pilot_Power(i) is the mobile station's pilot power at the moment of scheduling, and a(i) is the weighting factor; and
    means for determining a transmission schedule for the plurality of mobile stations based on the priority value.

13. The apparatus of claim 12, wherein the weighting factor is a function of:

$$a(i) = (\text{sector\_throughput}/\text{user\_throughput}(i))^b, \text{ where } 0 \leq b \leq 1.$$

14. An apparatus in a wireless communication system, comprising:
    a processing element; and
    a memory storage element coupled to the processing element, the memory storage element adapted for storing computer-readable instructions for implementing:
      means for receiving a channel condition indicator from a plurality of mobile stations;
      means for computing a priority value for each mobile station based on the channel condition indicator, wherein the priority value is a function of:

$$\text{Priority}(i) = \text{Pilot\_Power\_in Max} - \text{Pilot\_Power}(i),$$

where Priority(i) is the priority value for the ith mobile station, Pilot_Power_Max is the mobile station's maximum pilot power, and Pilot_Power(i) is the mobile station's pilot power at time of scheduling; and means for scheduling the plurality of mobile stations based on the computed priority values.

15. An apparatus in a wireless communication system, comprising:

a processing element; and a memory storage element coupled to the processing element, the memory storage element adapted for storing computer-readable instructions for implementing:

means for receiving a channel condition indicator from a plurality of mobile stations;

means for computing a priority value for each mobile station based on the channel condition indicator, wherein the priority value is a function of:

$$\text{Priority}(i) = a(i) * (\text{Pilot\_Power\_Average}(i) / \text{Pilot\_Power}(i))$$

where Priority(i) is a priority value for an i-th mobile user, Pilot_Power_Average(i) is a mobile station's pilot power averaged over a certain period of time, Pilot_Power(i) is a mobile station's pilot power at the moment of scheduling, and a(i) is a weighting factor; and means for scheduling the plurality of mobile stations based on the computed priority values.

16. The apparatus of claim 15 wherein:
the weighting factor is based upon the mobile user's speed.

17. The apparatus of claim 15 wherein:
the weighting factor is computed according to a function:

$$a(i) = (\text{sector\_throughput}/\text{user\_throughput}(i))^b, \text{ where } 0 \leq b \leq 1.$$

* * * * *